United States Patent
Enomoto et al.

(10) Patent No.: US 10,678,592 B2
(45) Date of Patent: *Jun. 9, 2020

(54) PROCESS CONTROL SYSTEM

(71) Applicant: Yokogawa Electric Corporation, Musashino-shi, Tokyo (JP)

(72) Inventors: Hiroya Enomoto, Musashino (JP); Toshiyuki Emori, Musashino (JP); Masanobu Tsuchiya, Musashino (JP); Takeshi Hongo, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 184 days.

This patent is subject to a terminal disclaimer.

(21) Appl. No.: 15/072,451

(22) Filed: Mar. 17, 2016

(65) Prior Publication Data

US 2016/0283276 A1    Sep. 29, 2016

(30) Foreign Application Priority Data

Mar. 27, 2015  (JP) ................. 2015-065501

(51) Int. Cl.
| | |
|---|---|
| *G06F 15/177* | (2006.01) |
| *G06F 9/50* | (2006.01) |
| *G06F 9/455* | (2018.01) |
| *G05B 19/042* | (2006.01) |
| *H04L 12/24* | (2006.01) |

(Continued)

(52) U.S. Cl.
CPC ........ *G06F 9/5011* (2013.01); *G05B 19/0428* (2013.01); *G06F 9/455* (2013.01); *G06F 9/45558* (2013.01); *H04L 41/0803* (2013.01); *H04L 43/14* (2013.01); *H04L 65/4007* (2013.01); *G05B 2219/1214* (2013.01); *G06F 2009/45595* (2013.01); *Y02P 90/14* (2015.11); *Y02P 90/18* (2015.11)

(58) Field of Classification Search
CPC ................. H04L 41/0803; H04L 65/4007
See application file for complete search history.

(56) References Cited

U.S. PATENT DOCUMENTS

| | | | |
|---|---|---|---|
| 2004/0153700 A1* | 8/2004 | Nixon | G05B 9/03 714/4.1 |
| 2008/0031171 A1* | 2/2008 | Joung | H04L 43/028 370/310 |

(Continued)

FOREIGN PATENT DOCUMENTS

| | | |
|---|---|---|
| JP | 10-283284 A | 10/1998 |
| JP | 2000-115289 A | 4/2000 |

(Continued)

OTHER PUBLICATIONS

Communication dated Jun. 3, 2016 issued by European Patent Office in counterpart European Patent Application No. 16160030.9.

(Continued)

*Primary Examiner* — Hua Fan
(74) *Attorney, Agent, or Firm* — Sughrue Mion, PLLC

(57) ABSTRACT

A process control system includes a PC that is to be connected to a redundant network. The PC comprises a virtualization unit, and a real-time communication unit configured to operate as a separate process independent of the virtualization unit.

8 Claims, 4 Drawing Sheets

(51) Int. Cl.
*H04L 12/26* (2006.01)
*H04L 29/06* (2006.01)

(56) References Cited

U.S. PATENT DOCUMENTS

| | | | | |
|---|---|---|---|---|
| 2010/0281195 A1* | 11/2010 | Daniel | ............... | G06F 9/45558 710/105 |
| 2011/0107406 A1* | 5/2011 | Frost | ............... | G06F 9/45558 726/6 |
| 2011/0125990 A1* | 5/2011 | Khosravi | ............... | G06F 9/4416 713/2 |
| 2013/0114610 A1 | 5/2013 | Polcyn et al. | | |
| 2013/0253671 A1 | 9/2013 | Torigoe | | |
| 2014/0164826 A1* | 6/2014 | Aoki | ............... | G06F 11/0739 714/10 |
| 2014/0280911 A1 | 9/2014 | Wood et al. | | |

FOREIGN PATENT DOCUMENTS

| | | |
|---|---|---|
| JP | 2004-213406 A | 7/2004 |
| JP | 2013-200669 A | 10/2013 |

OTHER PUBLICATIONS

Kouji Demachi et al; "Real-time plant network system Vnet/IP"; Yokogawa Technical Report, Yokogawa Electric Corporation; Apr. 20, 2005; vol. 49; No. 2; pp. 37-40; 8 pgs. total.

* cited by examiner

PROCESS CONTROL SYSTEM

CROSS-REFERENCE TO RELATED APPLICATION

The present application claims priority from Japanese Patent Application No. 2015-065501 filed on Mar. 27, 2015, the entire content of which is incorporated herein by reference.

BACKGROUND

1. Technical Field

The present disclosure relates to a process control system, and more specifically, to improvements on communication through a network.

2. Related Art

In a process control system of the related art, a PC group having an operation monitoring function and the like and a controller are connected to each other through an independent control network so as realize a real-time property and high reliability.

FIG. 3 depicts a configuration of an example of the process control system of the related art. In FIG. 3, a field device 1 such as a sensor and an actuator is connected to a control network 3 via a controller 2.

A sensor 11 of the field device 1 is configured to measure a physical amount of a measurement target and an actuator 12 is configured to control the physical amount of the measurement target. The controller 2 is distributed and arranged in a plant and has a programmable calculation processing function for exchanging a variety of information with an operation monitoring terminal unit and transmitting a driving signal to the actuator 12 on the basis of the information from the sensor 11.

The control network 3 has a duplex configuration so as to enhance reliability of the system, and a PC 4 is also connected to the control network 3. The PC 4 has a function of providing application software such as a function of providing an operator with a variety of information necessary to control and monitor the entire process control system on the basis of the information from the controller 2, an operation monitoring function for making appropriate instruction and management to respective system constitutional elements on the basis of the information and a device managing function for managing repair and maintenance conditions and the like of various devices.

The PC 4 is provided with a dedicated Network Interface Card (hereinafter, also referred to as NIC) 41 for connection to the control network 3, an interface NIC I/F 42 for NIC and the like, as hardware. In the PC 4, an OS 43, a variety of application software 44 and the like are stored as software.

In the meantime, the control network 3 is connected with a plurality of PCs 4 so as to form a PC group. However, in FIG. 3, only one PC 4 is shown.

From standpoints of easy procurement, low cost, technology innovation and the like, a universal PC is used as the PC 4 configuring the PC group, and MS-Windows (registered trademark) and the like having high universality are used as an OS.

The efforts to establish the control network 3 by the universal Ethernet (registered trademark) have been also made. In particular, a process control system of a duplex configuration is adopted so as to secure the high reliability.

The transmission standard of the general TCP/IP communication that is to be used for the Ethernet does not have a real-time property, which is required in the process control system.

The 'real-time property' described here is to guarantee secure implementation of predetermined processing within a defined time period. For example, 1) A communication response among a plurality of stations connected on the same network is within a defined value (for example: 5 ms) and 2) In the duplex network, a switching time from an operation-side to a standby-side is within a defined value (for example: 5 ms).

Therefore, in order to perform real-time communication on the Ethernet, a technology relating to 'real-time plant network system Vnet/IP (registered trademark)' for process automation based on Ethernet of 1 Gbps is developed and used, as disclosed in Non-Patent Document 1.

[Non-Patent Document 1] Koji Demachi et al., 'Real-time plant network system Vnet/IP', Yokogawa technical report, Yokogawa Electric Corporation, Apr. 20, 2005, Vol. 49, No. 2 (2005), p. 37-40

A dedicated interface card for Vnet/IP is required so as to perform Vnet/IP communication in a universal PC. However, since each dedicated interface card for Vnet/IP mounted on each PC has a master property of switching the redundant network 3, it is not possible to provide a plurality of interface cards on the same station address.

In the meantime, the generation changes of the universal PC, a variety of components thereof and the OS such as Windows (registered trademark) are made every few years, so that the cost performance largely increases. On the other hand, the supply of the old-generation product is stopped in many cases.

In the meantime, the process control system is necessarily required to continuously operate over the plant lifetime of about 30 years. The application software such as the operation monitoring function is required to have the operability and function as usual during the operating time period even when the generation changes of the OS and the like are made, because of the habit and education of the operator, the preservation of the know-how and the like.

FIG. 4 depicts a configuration of an example of the process control system of the related art for coping with the above needs, and the parts common to FIG. 3 are denoted with the same reference numerals. In FIG. 4, a virtualization unit 45 is provided between the hardware including the NIC 41 and the NIC I/F 42 and the OS 43.

While the virtualization unit 45 has a function of emulating the variety of hardware in a software manner, a throughput may be lowered. In the process control system placing great importance on the real-time property, it is important to take measures against the lowering of the throughput.

Also, as the technology of the universal PC is innovated, the universal I/F of the PC also evolves. As the universal I/F evolves, it is difficult to purchase a universal PC corresponding to the old-generation universal I/F. In order to cope with the new evolved universal I/F, it is necessarily required to again develop a dedicated interface card on many occasions in correspondence to the evolution of the universal I/F of the PC because it is not possible to continuously use the same dedicated interface card during the plant lifetime Also, when the universal Ethernet card is used, for example, it is necessary to perform switching processing and the like on the OS, upon occurrence of an abnormality, so that it is not possible to satisfy the need of the real-time processing such as prompt switching.

SUMMARY

Exemplary embodiments of the invention provides a process control system capable of securing a real-time property and high reliability necessary for the process control system and coping with a change in a lengthy life cycle of a plant.

A process control system according to an exemplary embodiment comprises:

a PC that is to be connected to a redundant network, wherein the PC comprises a virtualization unit, and a real-time communication unit configured to operate as a separate process independent of the virtualization unit.

The real-time communication unit may be configured to perform connection switching processing with the network.

The virtualization unit and the real-time communication unit may be exclusively allotted with a CPU resource of the PC, respectively.

A guest OS and application software may be configured to operate on the virtualization unit.

The process control system may be configured to perform at least one of plant control and safety instrumentation control.

By the above configurations, it is possible to implement the process control system capable of securing the real-time property and high reliability and coping with the change in the lengthy life cycle of the plant.

DETAILED DESCRIPTION

Figure 1:
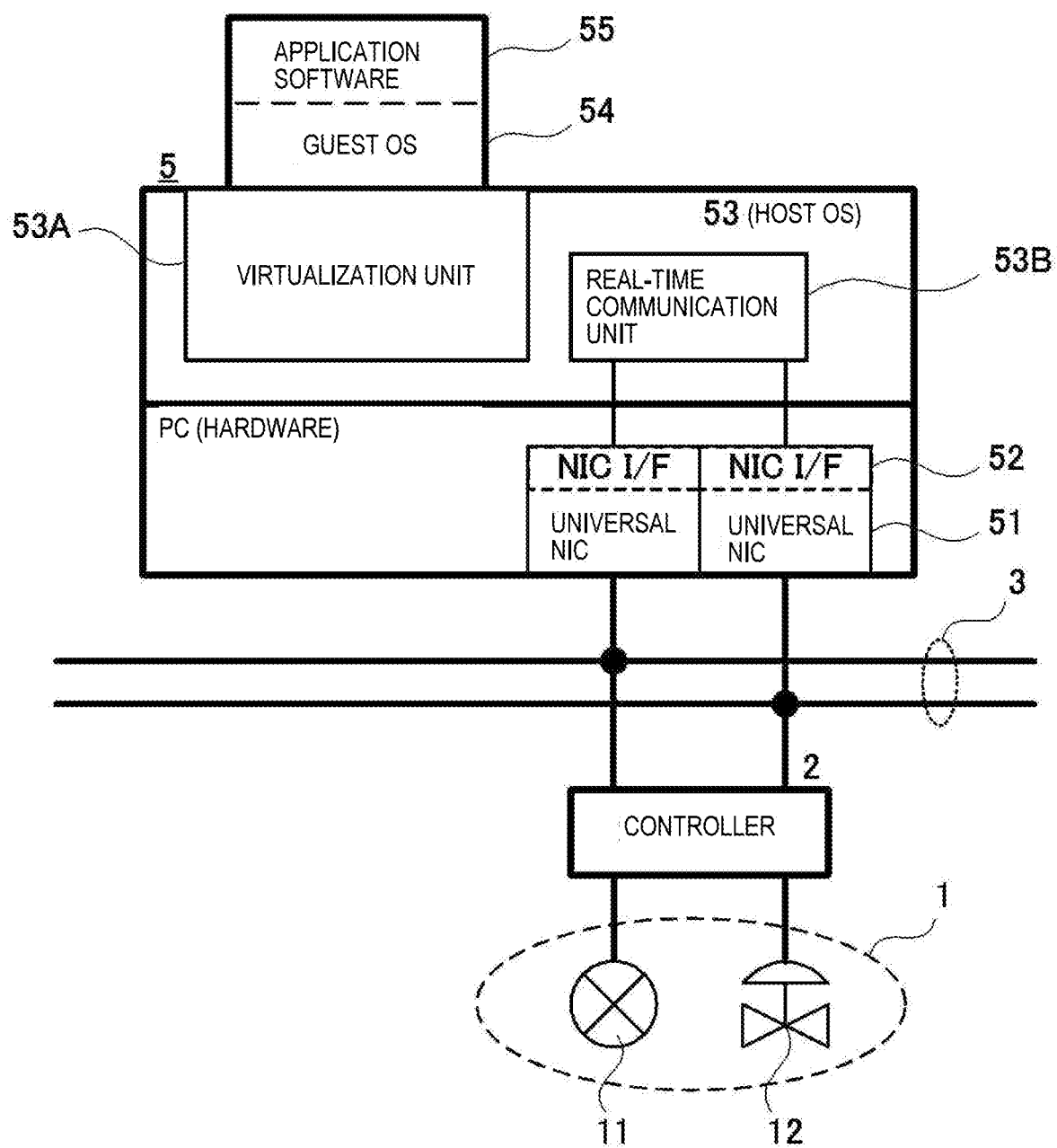
FIG. 1 depicts a configuration of an exemplary embodiment of the present invention.
Figure 3:
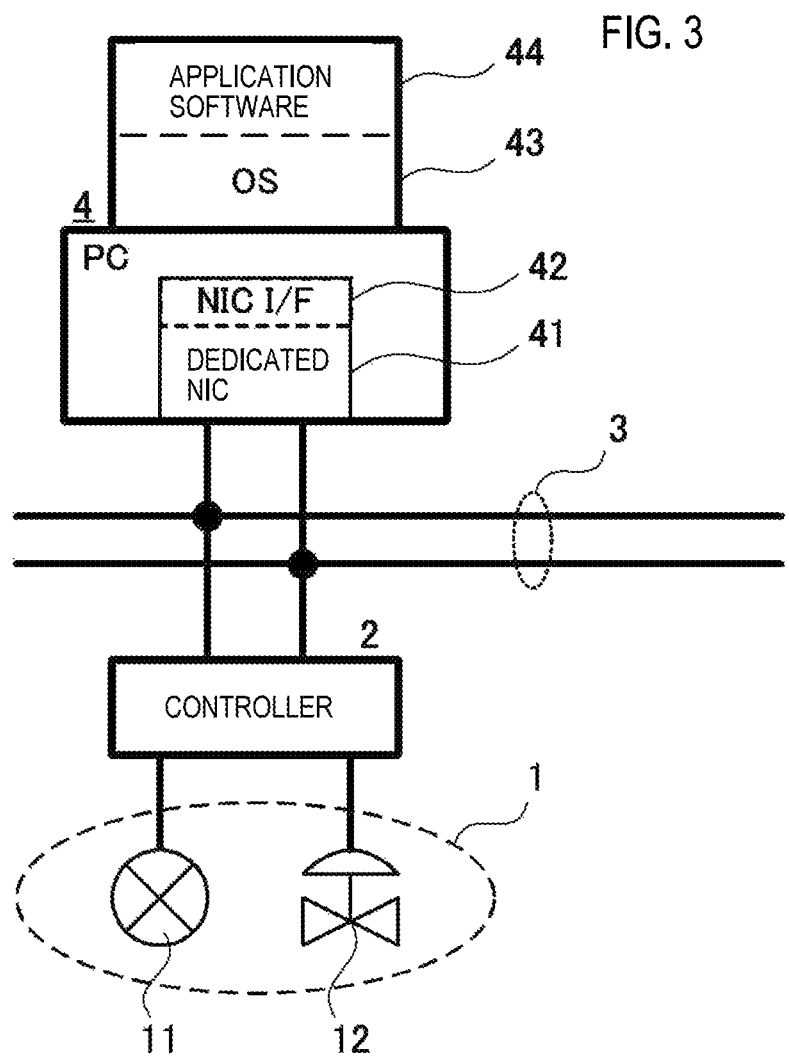
FIG. 3 depicts a configuration of an example of a process control system of the related art.
Figure 4:
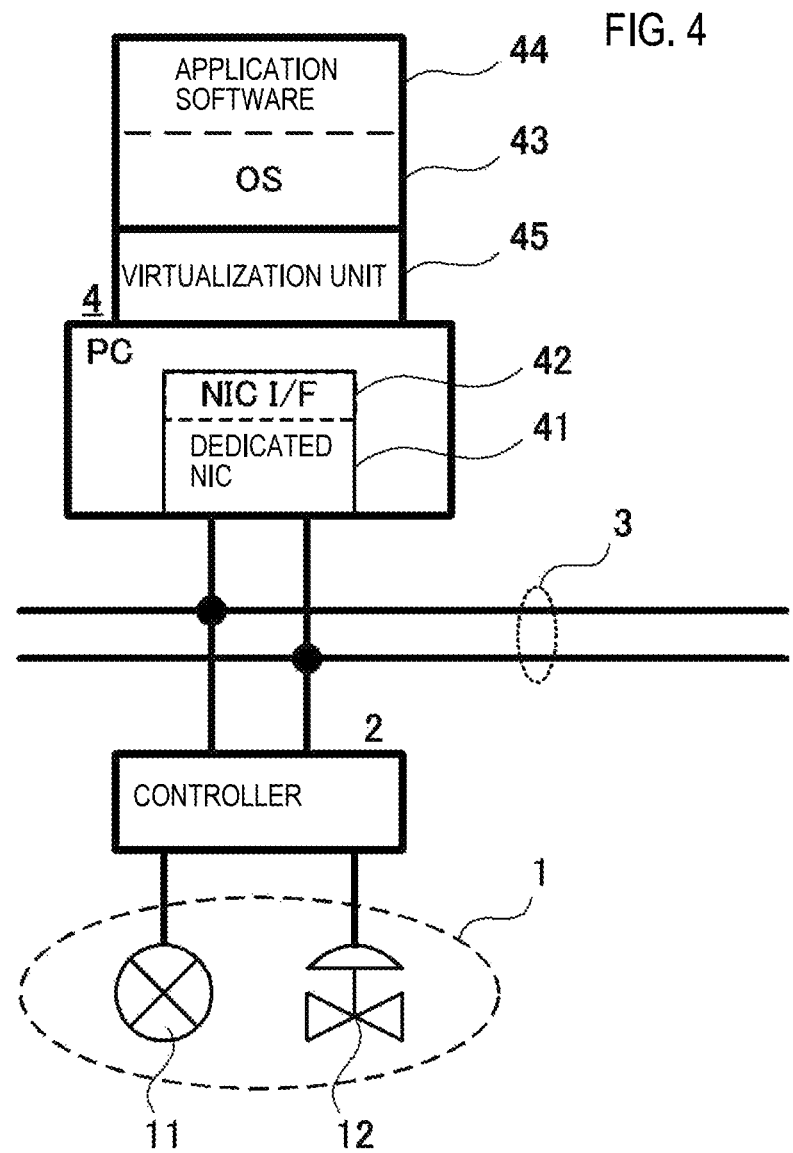
FIG. 4 depicts a configuration of another example of the process control system of the related art.

Hereinafter, an exemplary embodiment of the present invention will be described in detail with reference to the drawings. FIG. 1 depicts a configuration of an exemplary embodiment of the present invention. In FIG. 1, the parts common to FIG. 3 are denoted with the same reference numerals.

In FIG. 1, a PC 5 is provided with a universal NIC 51 for connection to a control network 3, an interface NIC I/F 52 for NIC, and the like, as the hardware. In the meantime, the PC 5 is also a universal product, and the generation change of the PC every few years is assumed, as described above. Also, it is assumed that the universal NIC 51 can perform TCP/IP communication.

A host OS 53 has a virtualization unit 53A, a real-time communication unit 53B and the like.

The virtualization unit 53A is configured to activate a guest OS 54 and application software 55. The guest OS 55 and the application software 55 are assumed to be kept as a set, irrespective of the generation changes of the hardware. The reason is that when a change of the guest OS such as generation change of Windows (registered trademark) XP into Windows 8 is made, an update of the application software is also required in many cases.

According to the present invention, the host OS 53 such as Linux (registered trademark) is provided between the hardware (the universal NIC 51, the interface NIC I/F 52 for NIC and the like) and the software (the guest OS54, the application software 55 and the like), for example.

On the host OS 53, the virtualization unit 53A and the real-time communication unit 53B configured to operate as separate processes completely independent of each other are provided.

A variety of communications are performed in the PC 5. However, it is assumed that the real-time communication unit 53B is responsible for only communication with the control network 3.

For example, the process control system is configured to acquire data from other station such as a controller via the control network 3 every about one second and to transmit a calculation processing result on the application software to the other station such as a controller.

The interface NIC I/F 52 for NIC is required to implement re-acquisition of missing data and redundant network switching upon occurrence of an abnormality in several tens of ms or less so that the above operations are not interfered.

Figure 2:
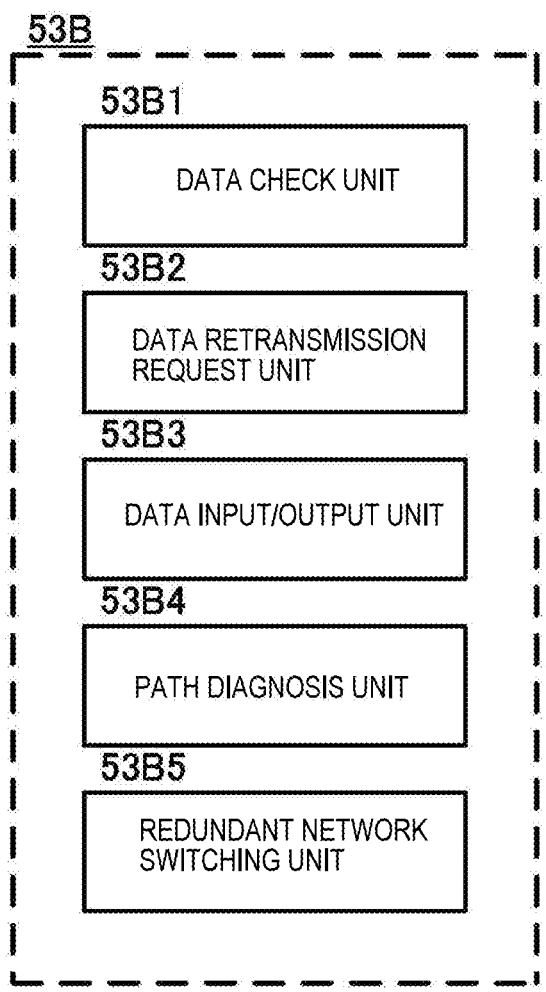
FIG. 2 is a block diagram depicting an example of a specific functional configuration of a real-time communication unit 53B.

FIG. 2 is a block diagram depicting an example of a specific functional configuration of the real-time communication unit 53B. In FIG. 2, the real-time communication unit 53B has a data check unit 53B1, a data retransmission request unit 53B2, a data input/output unit 53B3, a path diagnosis unit 53B4, a redundant network switching unit 53B5 and the like.

The data check unit 53B1 is configured to check data received from the other station through the control network 3 and to confirm whether or not data missing, a parity error and the like.

The data retransmission request unit 53B2 urges a transmission source to retransmit the data on the basis of an instruction from the data check unit 53B1 when the data check unit 53B1 detects the data missing and the like.

The data input/output unit 53B3 is configured to transfer input/output data from the control network 3, which is confirmed by the data check unit 53B1 that there is no data missing and the like, to the virtualization unit 53A. Each data is input/output to the guest OS54 and the application software 55 via the virtualization unit 53A.

The path diagnosis unit 53B4 is configured to perceive a state of the network path by determining whether a transmission/receipt response of a diagnosis packet to and from the other station connected to the control network 3 is within a defined time period (for example, within 5 ms).

When an abnormality is detected at the operating-side of the redundant network bus, the redundant network switching unit 53B5 promptly (for example, within 10 ms) switches the network from the operating-side to the standby-side.

The real-time communication unit 53B has only the functions, which are necessarily required to maintain and check the network communication path, as described above. Thereby, the real-time communication unit 53B is configured as the software module mounted on the universal network card and the host OS and can secure the high speed and exclude the influences from the other functions, without using the dedicated network card.

In this way, the virtualization unit 53A and the real-time communication unit 53B are placed on the completely independent processes, so that it is possible to prevent the data missing and the like without being influenced by the states/interrupt situations of the application software and guest OS.

Also, even when the network abnormality and the like occur, it is possible to continue the control real-time communication by the prompt network switching. For this reason, the application software and the guest OS can continue the operations thereof without being conscious of the occurrence of the network abnormality.

The real-time communication unit 53B is placed on the host OS, so that it is possible to use a universal NIC. Thereby, it is possible to enjoy the achievements of the technology innovations of the latest generation of PC and NIC all the time and to solve the procurement problems that an old-generation product cannot be acquired and an old-generation product is highly expensive.

The virtualization unit 53A separated from the real-time communication unit 53B is placed on the host OS and the guest OS and the application software are placed on the virtualization unit 53A, so that it is possible to continuously use the old generation of the guest OS and the application software, for example. Thereby, it is possible to continuously provide the same operability and the like over a long time period.

For example, the technology innovations of the network such as wireless network cause great changes. Also in this case, it is possible to adapt to the technology innovations of the network without influencing the application software and the guest OS simply by updating the real-time communication unit 53B. In the meantime, the application may be a gateway, an engineering tool and the like.

In the meantime, the real-time communication unit 53B, which is a process independent of the virtualization unit 53A, may be exclusively provided with a CPU resource of the PC 5. Also, in a case of a multicore CPU, an independent CPU core may be allotted to the real-time communication unit 53B.

Thereby, the real-time communication unit 53B can perform a more independent operation and is more difficult to be influenced by the operations of the other parts.

Also, a security ensuring unit such as a firewall, virus check and the like may be provided between the real-time communication unit 53B and the virtualization unit 53A. Thereby, it is possible to protect the guest OS, which is an old-generation OS, from the threat to the security.

Further, in the process control system, a large amount of data including device preservation data and the like in addition to the control data is handled. Therefore, a processing scheduling suitable for each data attribute is required.

For example, when one side of the duplex NIC is out of order, the NIC switching operation is processing that should be primarily performed. Therefore, in this case, the real-time communication unit may be configured to have functions such as priority control and band control and to execute processing that is required to implement QoS, which is most appropriate to the process control system.

As described above, according to the present invention, it is possible to implement the process control system capable of securing the real-time property and high reliability and coping with the change in the lengthy life cycle of the plant.

What is claimed is:

1. An electronic device in a process control system, the electronic device comprising:
    a first network interface connected to an operating-side network of a redundant control network,
    a second network interface connected to a standby-side network of the redundant control network; and
    a host operating system (OS),
    wherein the host OS includes:
        a virtualization unit is configured to run a guest OS and application software operating on the guest OS, and
        a real-time communication unit which is connected to the first and second network interfaces for communication with a controller connected to the redundant control network and which is configured to determine whether a response packet is received from the controller in response to transmission of a diagnosis packet to the controller through the first network interface within a first defined time period from the transmission of the diagnosis packet and, in response to the response packet not being received within the first defined time period, switch from communication through the first network interface to communication through the second network interface within a second defined time period from determining that the response packet is not within the first defined time period, wherein the real-time communication unit is configured to acquire data from the controller and transmit a calculation result of a calculation on the data by the application software to the controller every communication time period, and wherein the first defined time period is less than the second defined time period, and the second defined time period is less than the communication time period,
    wherein the real-time communication unit and the virtualization unit are installed on the same hardware, and controlled by the host OS as separate processes,
    wherein the real-time communication unit exchanges information with the controller, which is configured to transmit a driving signal to an actuator based on information from a sensor,
    wherein each of the first network interface and the second network interface is a universal Ethernet card.

2. The electronic device according to claim 1, wherein the real-time communication unit includes a path diagnosis unit which is configured to detect an abnormality at the operating-side network of the redundant control network, and a redundant network switching unit which is configured to switch from the communication through the first network interface to the communication through the second network interface.

3. The electronic device according to claim 1, wherein the real-time communication unit includes a data input/output unit which is configured to acquire the data, a data check unit which is configured to check the data and confirm whether or not data are missing, and a data retransmission request unit which is configured to request the transmission source of the data to retransmit the data via the redundant control network if missing of the data is detected.

4. The electronic device according to claim 1, wherein an independent central processing unit (CPU) core in a multi-core CPU on the hardware is allotted to the real-time communication unit.

5. The electronic device according to claim 1, wherein the electronic device is configured to perform at least one of plant control and safety instrumentation control.

6. The electronic device according to claim 1, wherein the first defined time period is about 5 ms, and the second defined time period is about 10 ms.

7. The electronic device according to claim 1, wherein the second defined time period is about 10 ms.

8. The electronic device according to claim 1, wherein the communication time period is equal to or less than about 1 second.

* * * * *